Figure 2:
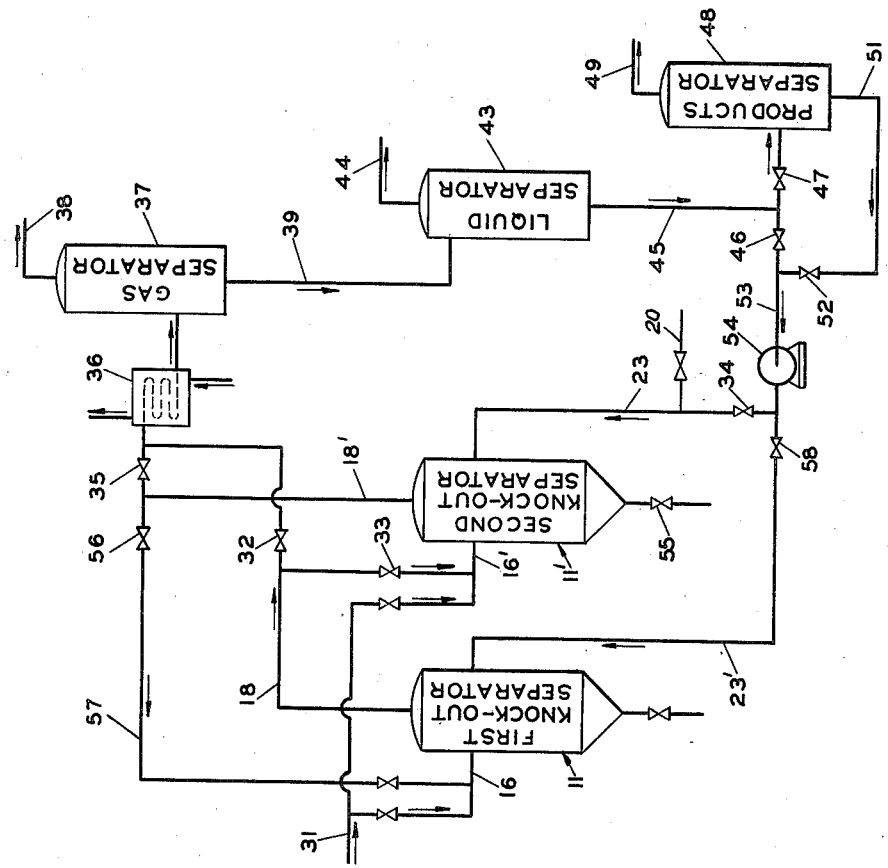

July 17, 1951

G. E. HAYS 2,560,645

METHOD OF SEPARATING HIGH CONDENSATION POINT
MATERIALS FROM HYDROCARBONS
Filed Nov. 28, 1947

INVENTOR.
G. E. HAYS
BY Hudson and Young
ATTORNEYS

Patented July 17, 1951

2,560,645

UNITED STATES PATENT OFFICE 2,560,645

METHOD OF SEPARATING HIGH CONDENSATION POINT MATERIALS FROM HYDROCARBONS

George E. Hays, Bartlesville, Okla., assignor to Phillips Petroleum Company, a corporation of Delaware Application November 28, 1947, Serial No. 788,407

5 Claims. (Cl. 260—450)

This invention relates to heat exchangers. In one of its more specific aspects it relates to the separation of high condensation point materials from a predominantly hydrocarbon stream resulting from the synthesis reaction of hydrogen and an oxide of carbon. In another of its more specific aspects it relates to a means and method for cooling hydrocarbon vapors. In another of its more specific aspects it relates to the concentration of by-products of Fischer-Tropsch reactions.

In the process of synthesizing organic compounds, which is known to the petroleum industry as Fischer-Tropsch synthesis, an oxide of carbon, e. g. carbon monoxide, and hydrogen are reacted together at suitable elevated temperatures in the presence of a selected catalyst to yield higher boiling organic compounds, including hydrocarbons ranging from light gaseous methane to relatively high condensation point materials, such as heavy liquids or waxes. Synthesis processes utilizing fluidized catalyst may be satisfactorily operated at temperatures ranging in the vicinity of between about 550° F. and about 610° F. and at a pressure ranging between about 10 and about 25 atmospheres. The effluent emerging from the reaction chamber may generally be presumed to be within these ranges of temperature and pressure.

In ordinary methods of purifying streams of hot vapors emerging from such reaction chambers, conventional heat exchangers have been used, wherein a cooling fluid is passed in indirect heat exchange relation with the hot vapors in cooling coils. The cooling step generally lowers the vapor temperature to a point ranging between about 80° F. and about 120° F. A portion of the vaporous material passing through the heat exchanger tends to solidify at temperatures ranging between about 80° F. and about 120° F. and above and deposit out within the cooling coils, eventually causing a stoppage therein.

An object of the present invention is to provide an improved knock-out chamber. Another object of the invention is to provide improved means for removing relatively high condensation point materials from effluent vapors of Fischer-Tropsch synthesis reactions. Another object is to provide an improved method for removing relatively high condensation point materials from the effluent of Fischer-Tropsch synthesis reactions. Another object is to provide an improved method and apparatus for concentrating by-products of a hydrocarbon synthesis process. Other and further objects will be apparent to those skilled in the art upon study of the accompanying discussion and drawing together with the claims.

Figure 1:
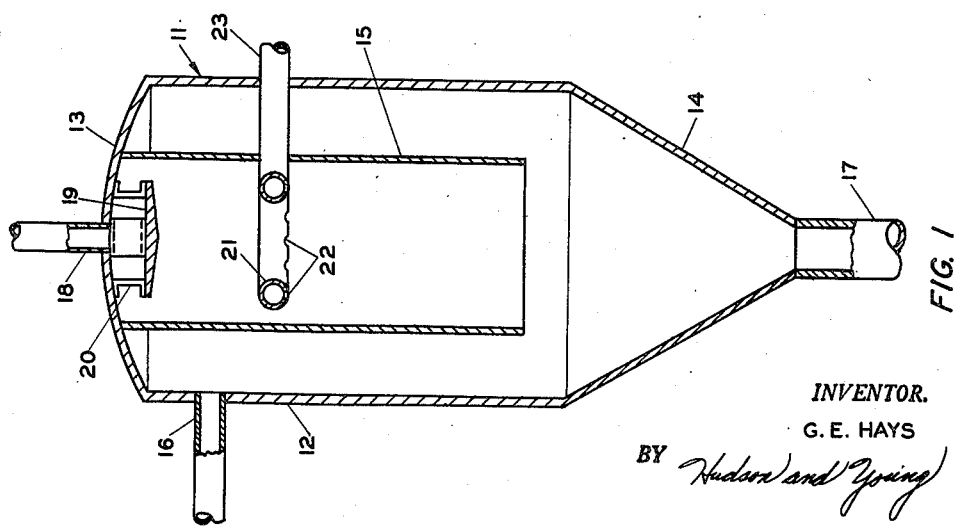

By the term "relatively high condensation point materials" it is intended to denote those materials which have a condensation point which is higher than that of the solvent materials or other vaporous materials with which they may be mixed. Understanding of the invention will be facilitated upon reference to and study of the attached drawings in which Figure 1 is a vertical section of a knock-out separation chamber embodying a preferred form of the invention. Figure 2 diagrammatically shows the flow of fluid effluent from a hydrocarbon synthesis reaction through knock-out, cooling, and separation steps and the recycle of residue materials.

Knock-out separation chamber 11 of Figure 1 comprises a preferably cylindrical shell 12 which is substantially vertically disposed and is closed at its ends by closure members 13 and 14. Provided within shell 12 is a preferably cylindrical shaped baffle shell 15 which is open at its lower end and closed at its upper end. A first separation zone is formed between the two shells and a second separation zone is formed within shell 15. The size of the two shells is preferably though not necessarily such that the horizontal cross-sectional area within shell 15 is at least as large or larger than the horizontal cross-sectional area of the annular space formed between shells 12 and 15. In cooling the gas, however, there will be a substantial reduction in gas volume in the second separation zone. For that reason it is possible to utilize an inner shell having a smaller horizontal cross-section than the horizontal cross-sectional area of the annular space between the shells. The closure at the upper end of shell 15 may be made by closure member 13 of outer shell 12. Vapor inlet conduits 16 is provided in the upper portion of outer shell 12 and is preferably tangentially positioned therein. Condensate outlet 17 is provided in the lower portion of closure member 14. Closure member 14 is preferably substantially conical in shape so as to direct condensation materials to a common point and outlet 17 is preferably positioned at that common point. Effluent outlets means, such as outlet 18, is provided in the upper portion of shell 15, preferably being positioned in the closure member at the top of shell 15. Baffle means, such as baffle member 19, is provided within the upper portion of shell 15 and is positioned so as to substantially knock-down any liquid droplets which might possibly be entrained in the vapors. Baffle member 19 may be secured to the upper closure member of shell 15 by bracket members 20. Inlet header member 21 is provided within shell 15, preferably in its upper portion and is provided with spray means, such as apertures 22. The spray means must be adaptable so as to be capable of injecting cooling fluid into the second separation zone as a fine mist or fog spray. Conduit 23 extends into shell 15, preferably through the wall of shell 12 and communicates between inlet header member 21 and a coolant supply source.

In the diagram of Figure 2 vaporous materials are passed by way of conduit 31 through vapor inlet 16 into the annular space formed between shells 12 and 15 of a first knock-out separator 11. The vapors, together with any material condensed therefrom, are rapidly passed downwardly through the first separation zone to the bottom of separator 11 where the vapors are caused to change direction and pass upwardly through the second separation zone in shell 15, past baffle member 19 and out of shell 15 through outlet 18. Valve 32 is closed and valve 33 is opened causing the vapors to pass through conduit 16' into the second knock-out separator 11'. The vapors are preferably tangentially injected into the annular space formed between shell 12 and shell 15 forming a third separation zone therebetween. The vapors, together with any materials condensed therefrom are passed at a relatively high velocity helically downwardly therein and the condensed material is caused to separate from the vapors by its own inertia and gravity. The velocity of vapor flow is decreased in the collection zone beneath the separation zones and the vapors are caused to change direction and pass upwardly into the chamber formed within shell 15, which chamber forms a fourth separation zone therein. A coolant, preferably water, is introduced through inlet 20 and line 23 into inlet header member 21 and escapes through apertures 22, forming a water fog spray within the fourth separation zone. The amount of water introduced into the separation zone is controlled by control means, such as valve 34, so that all or substantially all of the water introduced within the fourth separation zone is vaporized by the rising vaporous materials. In that manner the vaporous materials are cooled by removing heat therefrom by vaporization of the coolant. Those materials contained within the vapor stream which possess a condensation point falling above the temperature of the vapor effluent from the knock-out separator are condensed and part are caused to liquefy and part solidify by such cooling. These condensed materials precipitate to the collection zone formed in the bottom of chamber 11', below the third and fourth separation zones. The cooled vapor stream, together with the water vapors, pass upwardly through outlet conduit 18' through valve 35 and cooler 36 to gas separator 37. In gas separator 37 liquid materials collect in the lower portion of the separator and gaseous materials escape through effluent conduit 38. The liquid materials are caused to pass from gas separator 37 through conduit 39 to liquid separator 43. In liquid separator 43 those products which have little or no solubility in water are removed through outlet conduit 44 while the water and materials dissolved therein are passed from separator 43 through outlet conduit 45. The gas and liquid separation steps may be alternately accomplished in one vessel. Valve 46 may be closed and valve 47 opened so as to pass the water and the dissolved materials to products separator 48 in which water soluble products are removed through outlet conduit 49 and raffinate water is removed from separator 48 through conduit 51 and valve 52.

It may be desirable to concentrate the by-products of a synthesis reaction during the cooling of such reaction effluent. In such a situation valves 46, 47 and 52 may be regulated so as to pass a portion of the water containing water soluble products through valve 46, conduit 53 and pump 54 through valve 34 and conduit 23 into chamber 11' as the coolant for the knock-out separator. The water soluble products may then be removed from the other portion of water and the raffinate water returned to the recycle or the raffinate may be run off to a disposal point.

After a quantity of condensation materials, a portion of which may have solidified, has accumulated in the collection zone below the third and fourth separation zones of collector 11', fluid flow may be changed by valve adaptation so as to direct the vapor stream through conduits 31 and 16', into the third reaction zone of the second knock-out separator, downwardly therein and upwardly through the fourth separation zone thereby causing any condensed materials to separate from the vapors and accumulate in the collection zone. The coolant supply for the water fog spray may be shut off at valve 34 and turned on at valve 58. Heat from the vaporous materials in the second knock-out separator will tend to liquefy any substantially solidified condensation materials therein and valve 55 may be opened to blow the liquefied and solidified material from the collection zone of the second knock-out separator. Vapors are passed upwardly through the fourth separation zone, through outlet conduit 18', through valve 56 and conduit 57, and through conduit 16 where they are tangentially injected into the first separation zone of the first knock-out separator and are caused to pass helically downward through the first separation zone. Condensed materials are caused to dissociate from the vapors by their own inertia and collect in the collection zone formed in the bottom of the first knock-out separator. The vapors are passed upwardly through the second separation zone into contact with the water fog spray within the second separation zone. The operation accomplished herein is substantially the same as that which was described in the operation within the third and fourth separation zones before reversing the knock-out separators in the flow series. Vapors from the first knock-out separator pass upwardly through outlet conduit 18 and through valve 32 to cooler 36.

It is obvious that either the first or second knock-out separator may be adapted so as to be operated by itself or with any number of others in parallel rather than in series. Such operation is deemed to be within the scope of this invention. In such an adaptation the valves would be adjusted to pass the vapor stream through one or all of the separators at the same time and the cooling spray would be used in each. Effluent vapors from the separators would then be passed to cooler 36.

Advantages of this invention are illustrated by the following example. The apparatus arrangement, its size, the feed, and operating temperatures and pressures are presented as being typical and should not be construed to limit the invention unduly.

*Specific example*

In a plant for the production of liquid materials by the synthesis of hydrogen and an oxide of carbon, the reactor is operated under such conditions that the pressure is maintained in the vicinity of 300 p. s. i. g. and the temperature in the vicinity of 600° F. Approximately 610 cubic feet of gas per second are produced and sent to a separation system in which three knock-out separators are operated in parallel. The vapors are injected tangentially into the upper portion of the substantially vertically disposed cylindrical knock-out separators and are caused to pass helically downwardly, at a relatively high velocity, in the annular space formed between the outer shells, which are 13 feet in diameter, and inner cylindrical baffle shells, which are 9½ feet in diameter. As the vapors contact the cooler cylindrical baffles, those materials which have a condensation point above the temperature of the baffle cylinders are condensed and separate from the vapors by their own inertia. The velocity of vapor flow is decreased in the separation zones of the separators and the vapors change direction and pass upwardly into the cylindrical baffles, which are closed at their upper ends and are positioned substantially coaxially with and in the upper portion of said outer chambers. The cylindrical baffles are larger in cross-sectional area than the cross-sectional area of the annular space surrounding the baffle shells. A water fog spray is injected into the upper portion of the chamber within the cylindrical baffles at a total rate in the vicinity of 255 gallons per minute and at a temperature in the vicinity of 100° F. The vapor stream is cooled by the vaporization of the water and is reduced in temperature to about 375° F. Those vaporized materials which have a solidification point above about 90° F. are condensed from the vapors and fall to collection zones below the annular and baffle chamber spaces. The velocity of the vapors in the baffle chambers is less than 3½ feet per second and will not transport the finely divided condensate particles out of the chamber. The spray is, however, adjusted so as to preclude such droplets. Condensed material in the collection zones of the separators is continuously drawn off from the bottom of the separators and vapors from the upper end of the separators are passed to a cooler where the water and liquid products are condensed. The water layer is removed from the fractions not miscible with water and is divided into two streams. One stream is recycled to the knock-out separators and the other stream is passed through a recovery zone in which water-soluble acids, alcohols, aldehydes and ketones are recovered and the raffinate water is recycled to the knock-out separators.

The process of knocking relatively high condensation point materials from vapor streams is not to be limited to hydrocarbons. It is obvious that materials which have a relatively higher condensation point than the solvent vapors may be removed from such vapors by utilizing a coolant having a condensation point lower than that of the material to be removed and preferably being relatively immiscible in the liquid phase of the solvent vapors.

As will be evident to those skilled in the art, various modifications of this invention can be made or followed in the light of the foregoing disclosure and discussion without departing from the spirit or scope of the disclosure or from the scope of the claims.

I claim:

1. The method of separating high condensation point materials from a predominantly hydrocarbon vapor stream which comprises the steps of tangentially introducing said vapors into a first annular separation zone; passing said vapors and any material condensed therefrom helically downwardly therein, whereby said condensed material is separated from said vapors by its own inertia and gravity; passing said vapors upwardly and inwardly into a second separation zone; injecting a water fog spray into the upper portion of said second separation zone at a rate sufficient to vaporize substantially all of said water by direct heat exchange with said rising vapor stream, thereby cooling said vapor stream by removing heat therefrom as heat of vaporization of the water; separating liquid and vapor material in said second separation zone; removing water and stream vapors from the upper portion of said second separation zone; accumulating liquid and other condensed material in a collection zone below said separation zones; and removing said liquid and other condensed material from said collection zone.

2. The method of separating high condensation point material from a stream of predominantly hydrocarbon vapors which comprises the steps of introducing said vapors into a first separation zone; passing said vapors and any material condensed therefrom downwardly therein, whereby said condensed material is separated from said vapors by its own inertia and gravity and accumulates in a first collection zone; passing said vapors upwardly into and out of a second separation zone; introducing said vapors tangentially into a third separation zone; passing said vapors and any material condensed therefrom helically downwardly therein, whereby said condensed material is separated from said vapors by its own inertia and gravity; passing said vapors upwardly into a fourth separation zone; injecting a water fog spray into the upper portion of said fourth separation zone at a rate sufficient to vaporize substantially all of said water by direct heat exchange with said rising vapors, thereby cooling said vapors and condensate; removing said vapor stream together with said water vapors from the upper portion of said fourth separation zone and accumulating condensed material in a second collection zone below said third and fourth separation zones; alternately reversing flow in the system by shutting off said water fog spray in said fourth separation zone, switching the vapor feed from said first separation zone to said third separation zone and introducing said vapor stream into said third separation zone; passing said vapors and any material condensed therefrom downwardly therein, whereby said condensed material is separated from said vapors and accumulates in said second collection zone and any accumulated solidified condensate in said second collection zone is substantially liquefied by heat exchange with said vapors; removing said condensate from the lower portion of said second collection zone; passing said vapors upwardly into and out of said fourth separation zone; introducing said vapors from said fourth separation zone tangentially into said first separation zone; passing said vapors and any material condensed therefrom helically downwardly therein, whereby said condensed material is separated from said vapors and accumulates in said first collection zone; passing said vapors upwardly into said second separation zone; injecting a water fog spray into the upper portion of said second separation zone at a rate sufficient to vaporize substantially all of said water by direct heat exchange with said rising vapors, thereby cooling said vapors and condensate; removing said vapors from the upper portion of said second separation zone; accumulating condensed material in said first collection zone below said first and second separation zones; and removing said material from the lower portion of said first collection zone.

3. In a process for purifying hydrocarbons resulting from the synthesis reaction of hydrogen and an oxide of carbon the method comprising the steps of introducing said hydrocarbons in a vaporous state into a first separation zone, passing said vapors and any condensed material downwardly therein; passing said vapors upwardly into a second separation zone at least partially within said first separation zone; injecting a water fog spray into said second zone at a rate sufficient to vaporize substantially all of said water by direct heat exchange with said rising vaporous hydrocarbons, thereby cooling said hydrocarbons; collecting said material condensed from said hydrocarbons in a collection zone below said separation zones; removing said condensed material from said collection zone; removing water and hydrocarbon vapors from the upper portion of said second zone; passing said vapors through a cooling zone; separating said water from said hydrocarbons; and concentrating by-products of said synthesis which are dissolved in said water by recycling a portion of said water as said water fog spray.

4. In a process for purifying hydrocarbons resulting from the synthesis reaction of hydrogen and an oxide of carbon the method comprising the steps of introducing said hydrocarbons in a vaporous state tangentially into a first separation zone; passing said vapors and any material condensed therefrom helically downwardly therein whereby condsensed material is separated from said vapors by its own inertia; passing said vapors upwardly into a second separation zone; injecting a water fog spray into the upper portion of said second zone at a rate sufficient to vaporize substantially all of said water by direct heat exchange with said rising vaporous hydrocarbons, thereby cooling said hydrocarbons; collecting said material condensed from said hydrocarbons in a collection zone below said separation zone; removing said condensed material from said collection zone; removing said water and hydrocarbon vapors from the upper portion of said second separation zone; passing said vapors through a cooling zone; separating uncondensed hydrocarbon vapors from the liquid resulting from condensation of said cooled vapors; separating condensed hydrocarbons from condensed water; and concentrating by-products of said synthesis which are dissolved in said water by recycling a portion of said water as said water fog spray.

5. A method for purifying hydrocarbons resulting from the synthesis reaction of hydrogen and an oxide of carbon which comprises the steps of introducing said hydrocarbons in a vaporous state into a first separation zone; passing said vapors and any condensed material downwardly therein; passing said vapors upwardly into a second separation zone; injecting a water fog spray into said second separation zone at a rate sufficient to vaporize substantially all of said water by direct heat exchange with said rising vaporous hydrocarbons; removing material condensed from said hydrocarbons from said separation zones; removing water and hydrocarbon vapors from the upper portion of said second separation zone; and separating said water from said hydrocarbons.

GEORGE E. HAYS.

REFERENCES CITED

The following references are of record in the file of this patent:

UNITED STATES PATENTS

| Number | Name | Date |
| --- | --- | --- |
| 1,504,386 | Senseman | Aug. 12, 1924 |
| 1,597,674 | Doherty | Aug. 31, 1926 |
| 1,791,940 | Spencer | Feb. 10, 1931 |
| 1,850,429 | Wagner | Mar. 22, 1932 |
| 1,892,452 | Dubbs | Dec. 27, 1932 |
| 1,979,841 | Pier et al. | Nov. 6, 1934 |
| 2,078,407 | Ormont | Apr. 27, 1937 |
| 2,123,799 | Podbielniak | July 12, 1938 |
| 2,126,400 | Leamon | Aug. 9, 1938 |
| 2,236,535 | Hasche | Apr. 1, 1941 |
| 2,295,101 | Dunham | Sept. 8, 1942 |
| 2,354,675 | Fisher | Aug. 1, 1944 |
| 2,354,677 | Fisher | Aug. 1, 1944 |
| 2,436,957 | Eastman | Mar. 2, 1948 |
| 2,446,181 | Kraus | Aug. 3, 1948 |
| 2,448,257 | Evans | Aug. 31, 1948 |